(12) United States Patent
Aliakseyeu et al.

(10) Patent No.: US 10,546,422 B2
(45) Date of Patent: Jan. 28, 2020

(54) SYSTEM AND METHOD FOR AUGMENTED REALITY SUPPORT USING A LIGHTING SYSTEM'S SENSOR DATA

(71) Applicant: SIGNIFY HOLDING B.V., Eindhoven (NL)

(72) Inventors: Dzmitry Viktorovich Aliakseyeu, Eindhoven (NL); Talmai BrandÃO De Oliveira, Peekskill, NY (US); Hongxin Chen, Shanghai (CN); Philip Steven Newton, Waalre (NL); Dave Alberto Tavares Cavalcanti, Mahopac, NY (US); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 14/917,569

(22) PCT Filed: Sep. 4, 2014

(86) PCT No.: PCT/IB2014/064256
§ 371 (c)(1),
(2) Date: Mar. 8, 2016

(87) PCT Pub. No.: WO2015/036903
PCT Pub. Date: Mar. 19, 2015

(65) Prior Publication Data
US 2016/0225186 A1    Aug. 4, 2016

Related U.S. Application Data

(60) Provisional application No. 61/877,324, filed on Sep. 13, 2013.

(51) Int. Cl.
*G06T 19/00* (2011.01)
*G01S 5/16* (2006.01)
*G06T 19/20* (2011.01)

(52) U.S. Cl.
CPC .............. *G06T 19/006* (2013.01); *G01S 5/16* (2013.01); *G06T 19/20* (2013.01); *G06T 2219/2004* (2013.01)

(58) Field of Classification Search
CPC .. G06T 19/006; G01C 21/206; G01C 21/3647
(Continued)

(56) References Cited

U.S. PATENT DOCUMENTS 8,797,321 B1 * 8/2014 Bertolami ............... G06T 15/50
345/426
9,269,011 B1 * 2/2016 Sikka .................... G06K 9/3233
(Continued)

FOREIGN PATENT DOCUMENTS

CN    101710429 A    9/2012
CN    103119399 A    5/2013
(Continued)

OTHER PUBLICATIONS

Shinichiro Haruyama, "Visible Light Communications: Recent Activities in Japan", Smart Spaces: A Smart Lighting ERC Industry—Academia Day at BU Photonics Center, Boston, Univ., Feb. 8, 2011, XP055163908, http://smartlighting.rpi.edu/resources/PDFs/smartspaces2011/Smart_Lighting_ERC_Haruyama_2011_02_08.pdf.

*Primary Examiner* — Barry Drennan
*Assistant Examiner* — Terrell M Robinson
(74) *Attorney, Agent, or Firm* — Daniel J. Piotrowski

(57) ABSTRACT

Methods and systems for providing enhanced augmented reality features and enhancements are disclosed such as an AR support system (100) using lighting units (LU1) in a
(Continued)

lighting system (100) to improve performance of augmented reality devices (20). The lighting system (100) may also take advantage of features of the augmented reality devices (20) to improve the safety and performance of the lighting system (100). The lighting units (LU1) include sensors and communication capabilities that detect situations as to when the augmented device would need to be assisted by the lighting network. Finally a method to provide assistance information to the augmented reality device while optimizing energy savings is also described.

14 Claims, 8 Drawing Sheets

(58) Field of Classification Search
USPC .......................................................... 345/633
See application file for complete search history.

(56) References Cited

U.S. PATENT DOCUMENTS

| | | | | |
|---|---|---|---|---|
| 2008/0246694 | A1* | 10/2008 | Fischer | G02B 27/017 345/9 |
| 2011/0199479 | A1 | 8/2011 | Waldman | |
| 2011/0234631 | A1 | 9/2011 | Kim et al. | |
| 2012/0029358 | A1 | 2/2012 | Lin | |
| 2012/0120103 | A1* | 5/2012 | Border | G02B 27/017 345/633 |
| 2012/0224060 | A1* | 9/2012 | Gurevich | B60R 1/00 348/148 |
| 2012/0307075 | A1 | 12/2012 | Margalit | |
| 2013/0026224 | A1 | 1/2013 | Ganick et al. | |
| 2013/0030747 | A1 | 1/2013 | Ganick et al. | |
| 2013/0141434 | A1* | 6/2013 | Sugden | G02B 27/017 345/426 |
| 2013/0342568 | A1* | 12/2013 | Ambrus | G09G 3/003 345/633 |
| 2014/0247250 | A1* | 9/2014 | Sheng | G06F 3/0436 345/177 |
| 2016/0125655 | A1* | 5/2016 | Tian | G06T 11/00 345/633 |
| 2018/0017791 | A1* | 1/2018 | Beckman | G02B 27/01 |

FOREIGN PATENT DOCUMENTS

| | | | | |
|---|---|---|---|---|
| JP | 2007257286 | A | 10/2007 | |
| JP | 2008199569 | A | 8/2008 | |
| JP | 2009036571 | A | 2/2009 | |
| JP | 2012054689 | A | 3/2012 | |
| JP | 2012514830 | A | 6/2012 | |
| JP | 2013046117 | A | 3/2013 | |
| JP | 2013110599 | A | 6/2013 | |
| KR | 2011107545 | A | 10/2011 | |
| WO | 2012168823 | A1 | 12/2012 | |
| WO | WO 2014209268 | A1 * | 12/2014 | ............ H04B 10/80 |

* cited by examiner

SYSTEM AND METHOD FOR AUGMENTED REALITY SUPPORT USING A LIGHTING SYSTEM'S SENSOR DATA

CROSS-REFERENCE TO PRIOR APPLICATIONS

This application is the U.S. National Phase application under 35 U.S.C. § 371 of International Application No. PCT/IB2014/064256, filed on Sep. 4, 2014, which claims the benefit of U.S. Patent Application No. 61/877,324, filed on Sep. 13, 2013. These applications are hereby incorporated by reference herein.

The present invention relates to a method and system for providing enhanced augmented reality features, in particular, an information support method and system using lighting systems and network to improve performance of the augmented reality devices. The lighting system may also take advantage of features of the augmented reality devices to improve the safety and performance of the lighting system.

Augmented reality (AR) is a live, direct or indirect, view of a physical, real-world environment whose elements are augmented (or supplemented) by computer-generated sensory input such as sound, video, graphics or GPS data. It is related to a more general concept called mediated reality in which a view of reality is modified (possibly even diminished rather than augmented) by a computer. As a result, the technology functions by enhancing one's current perception of reality. Augmentation is conventionally in real-time and in semantic context with environmental elements, such as sports scores on TV during a match. With the help of advanced AR technology (e.g., adding computer vision and object recognition) the information about the surrounding real world of the user becomes interactive and digitally manipulable. Artificial information about the environment and its objects can be overlaid on the real world.

Augmented reality is becoming a commonplace thing with the increase of smartphones, as well as, newer technologies such as Google's "glasses". AR is expected to become even more pervasive in the future. Moreover, AR is becoming an important topic in the car industry due to the rapid developments in head-up displays on car windshields.

For any AR application, the alignment of a camera view with the information/visualization layer is essential. Conventionally, this is done using one or more sensors embedded in an AR device. The sensors may include GPS for location, a compass, and/or an accelerometer for orientation. However, since these sensors are not accurate enough and sometimes do not provide reliable information (due to signal loss), often they are complemented and sometimes even replaced with image processing where unique features of the environment in the camera view are analyzed and matched for precise localization and alignment. These features might be particular street features, building edges, unique building profiles, etc., and are readily available in applications like Google Map. For example, such conventional features are disclosed in US20120293548 and US20110199479.

Development of augmented reality into different application domains is starting on smartphones, heads-up displays on car windshields and augmented glasses. Today's smartphone and tablets already have all the resources available to offer augmented reality applications (displays, cameras, image processing, location- and orientation sensing, internet connectivity). Similar infrastructures are starting to emerge in the automotive industry, driven by the developments in head-up displays which provide a safer way to inform a driver about navigation and traffic, and where increasingly also the other required resources are available.

Despite the fact that the AR based applications offer many exciting possibilities, there are major drawbacks. The first is the need for good lighting conditions. To have near perfect alignment of real images and a virtual overlay, an AR application needs to process camera picture information which is strongly affected by the light conditions. As result, the performance of such applications will degrade significantly during evening and night time.

In addition, in order for AR devices to be useful, the AR devices will need to be smaller which may cause them to be resource constrained. Therefore, the AR devices will need assistance from external computing resources to enhance their usability and performance. For instance, if you are walking at night in an area where there is a low light level, performance of camera sensors on the AR device may be compromised. Another situation where performance of the AF device may be hampered is on foggy roads where it is difficult for drivers to see objects far ahead of them. Even with a camera installed on the car, the captured image may be unclear. The general problem is determining what kind of information is needed to assist in certain situations (low light levels in pedestrian area; foggy road; etc), how to collect it and how to communicate with the AR device.

Accordingly, a need exists in the art for systems and methods to address the shortcomings of the conventional systems described above.

One aspect of the present invention is using sensors that may be deployed throughout a location or city to provide different types of data that can be used by the AR device to improve performance. In this regard, intelligent lighting systems may be used to provide additional information to AR devices For example, the present invention may use lighting cues provided by an outdoor lighting infrastructure during nighttime to increase performance and satisfaction of the AR devices.

The present invention may also use an augmented reality support system to help increase the performance and optimize energy savings of the lighting system. Conventional intelligent lighting systems are known that can dim down or increase light output based on presence detection, e.g., a car on the road or a person on the walkway. When a detection event occurs, the light level output from a lighting unit may increase for a certain time. This increases safety and enhance the visibility, but decreases energy savings. With the help of augmented reality, the light levels output does not need to be increased to the same levels all the time when a detection occurs.

One aspect of the present invention is an augmented reality support system in which AR devices exchange information with the intelligent lighting systems. The lighting systems include sensor-enabled devices with communication capabilities (such as cameras, presence detection devices, other sensors capable of classifying different objects, and maybe even 3D modeling). The exchange of information may include nearby objects identified, obstacles, historical information and environmental conditions (low light level, fog, etc) depending on a particular detected event or situation.

The AR support system can provide support information and assistance to the AR device including images, 3D object models, distance to objects in certain locations, as well as executing lighting control actions to support the augmented device while maximizing the energy savings. For instance, light level output could be increased but at much lower lighting levels based on the capability of the AR device. For example, this may include projection transformation and image registration technology to overlap multiple images in a way that both nearby as well as further objects become "clear" and transmitting overlapped images to the augmented device.

Another aspect of the present invention is the use of cues and/or codes from outdoor lighting infrastructures (e.g., street lighting) for providing information for alignment of the AR view with the real life imagery. Using location methods such as GPS compasses and accelerometers a rough estimation is made of the camera view point by the AR device. This rough estimation is augmented with information from one or more light points carrying unique identifiers (e.g., coded light) that are in the view of AR devise's camera. Alternatively, aligning the AR view may be based on detecting light patterns generated by one or more light generating devices (including temporal coded light patterns and/or spatial light patterns of multiple light sources within a camera view). The additional information provided by the light points allows for the improved alignment as compared with conventional methods.

One embodiment of the present invention is directed to a method for improving the performance of an AR device. The method includes the steps of receiving, by the AR device, a coded signal from a lighting unit in a lighting system and processing the coded signal to improve the alignment of a view of the AR device.

In another embodiment of the present invention an AR device includes a sensor arranged to receive a coded signal from a lighting unit in a lighting system, a display and a processor arranged to use the coded signal to improve the alignment of a view on the display.

Another embodiment of the present invention is directed to an AR support system including a lighting system including a plurality of lighting units. The lighting units each including a sensor and communication interface. The AR support system also includes a control unit having a communication unit arranged to communication with one or more of the lighting units. The communication interface is also used to transmit and/or receive data between one or more AR devices.

In general, the various aspects and embodiments of the present invention may be combined and coupled in any way possible within the scope of the invention. The subject matter that is regarded as the invention is particularly pointed out and distinctly claimed in the claims at the conclusion of the specification.

The foregoing and other features and advantages of the invention will be apparent from the following detailed description taken in conjunction with the accompanying drawings.

Figure 1:
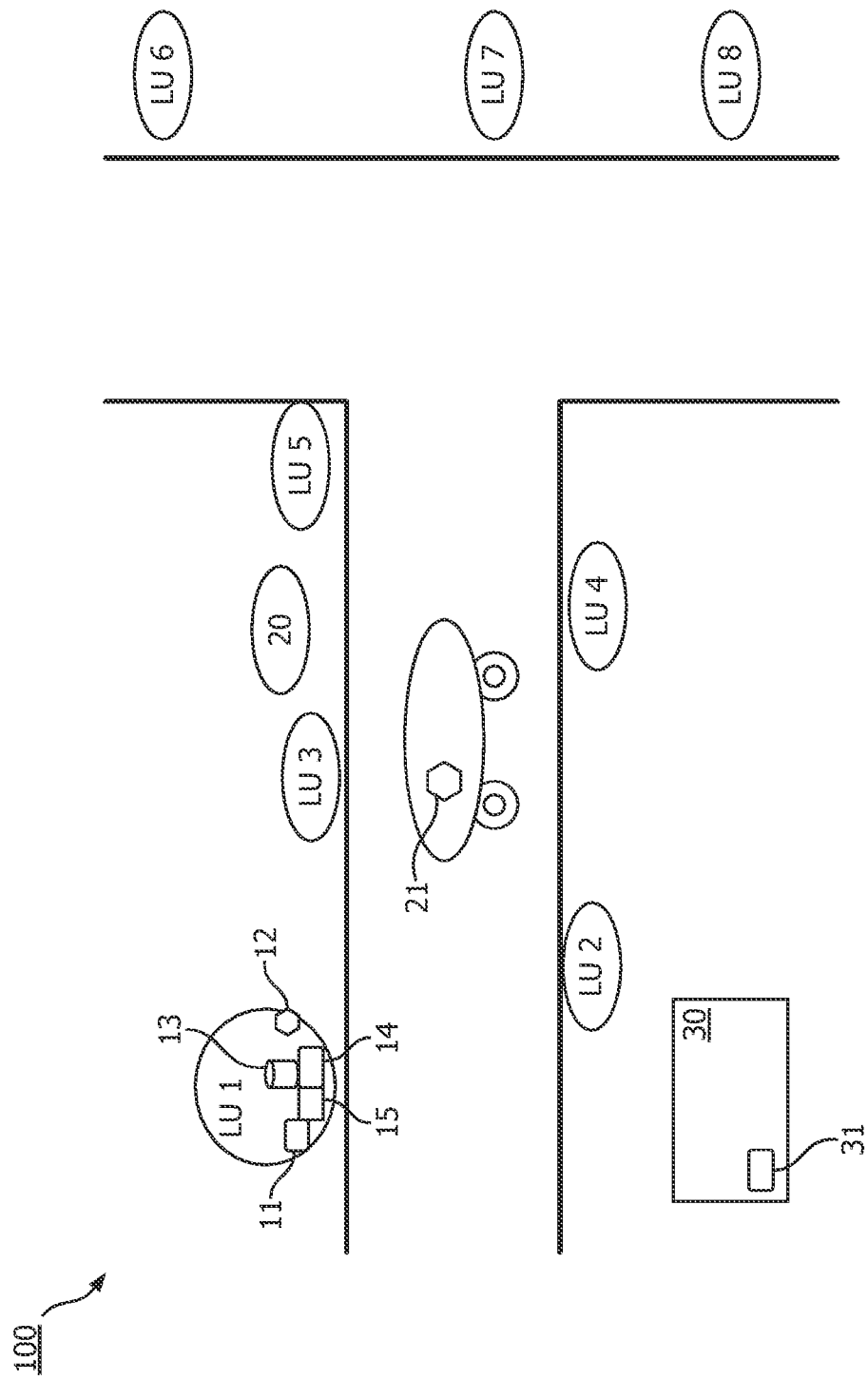
FIG. 1 shows a lighting system 100 according to an embodiment of the present invention.

As shown in FIG. 1, the lighting system 100 includes one or more lighting units (LU1-LU8). The LUs (LU1-LU8) include a light producing mechanism 11, one or more sensors 12, a database 13, a communication interface 14 and a light level controller 15.

The sensor 12 may be used to detect one or more AR device(s) 20 or other objects within a predetermined sensing range. The sensor 12 may be any suitable sensor to achieve this result. For example, passive infrared, radar sensors, or cameras can be used to give out detection results. Such sensors 12 may send a "detection" result if an object is detected within the sensing range of the sensor 12. The sensor 12 may also periodically attempt to detect objects within the sensing range and if an object is detected, a "detect" results, or else a "no detection" results.

The AR device(s) 20 also include one or more sensors 21. The sensor 21 may be used to detect coded light signals from the LUs (LU1-LU8).

The communication interface 14 may be, for example, a hardwired link and/or a wireless interface compatible with DSRC, 3G, LTE, WiFi, RFID, wireless mess or another type of wireless communication system and/or a visual light communication. The communication interface 14 may be any suitable communication arrangement to transfer data between one or more of the LUs (1-8).

The database 13 need not be included in the LUs (1-8). Since the LUs (1-8) can communicate with one or more other LUs (1-8) and/or an intermediate node (not shown in FIG. 1), any data that would need to be stored or accessed by a particular LU (LU1-LU8) can be stored in and accessed from the database 13 in another LU (LU1-LU8), in the intermediate node, or other network storage as needed.

As shown in FIG. 1, the lighting system 100 may also include a control unit 30 (e.g., a service center, back office, maintenance center, etc.). The control unit 30 may be located near or at a remote location from the LUs (LU1-LU8). The central control unit 30 includes a communication unit 31 and may also include a database 32. The communication unit 31 is used to communicate with the LUs (LU1-LU8) or other external networks (not shown in FIG. 1). The control unit 30 is communicatively coupled to the LUs (LU1-LU8), either directly or indirectly. For example, the control unit 30 may be in direct communication via a wired and/or wireless/wireless-mesh connection or an indirect communication via a network such as the Internet, Intranet, a wide area network (WAN), a metropolitan area network (MAN), a local area network (LAN), a terrestrial broadcast system, a cable network, a satellite network, a wireless network, power line or a telephone network (POTS), as well as portions or combinations of these and other types of networks.

The control unit 30 includes algorithms for operating, invoking on/off time and sequencing, dimming time and percentage, and other control functions. The control unit 30 may also perform data logging of parameters such as run-hours or energy use, alarming and scheduling functions.

The communication interface 14, as noted above in relation to the communication unit 31, may be any suitable communication arrangement to transfer data to and/or from the control unit 30. In this regard, via the communication interface 14, each LU (LU1-LU8) maybe in communication, as may be needed, with the control unit 30 directly and/or via another LU (LU1-LU8). The communication interface 14 enables remote command, control, and monitoring of the LUs (LU1-LU8).

The sensors 12 deployed throughout the lighting system 100 capture data. This data may be related to the AR device(s) 20 and/or non-AR devices within range of the sensors 12. Raw data and/or pre-processed data (referred to as "data") is transmitted to the AR device 20. The data can also be transmitted to the control unit 30 or other network device for additional processing related to the augmented reality.

As noted above, in conventional intelligent lighting systems when a presence detection is made, e.g., a car on the road or a person on the walkway, the light output of the LU (LU1-LU8) is increased (if in a dimed state). In one embodiment, when the lighting system 100 detects nearby AR devices 20, the light output need not automatically increase in the lighting system 100. By exchanging the data between the lighting system 100 and the AR device(s) 20, information can be used to provide guidance, foregoing the need to increase the light output (or change the dimming level) and maximizing energy savings. For instance, if there is only one pedestrian with the AR device 20, as long as enough information can be provided to the AR device 20, the light output does not need to be increased, so more energy can be saved.

Additionally, by providing information of visualization of the area (obstacles and other constraints that would not otherwise be detected alone or due to environmental conditions such as low light levels), the performance of the AR device 20 can be improved. The data provided to the AR device 20 by the lighting system 100 may include historic information (images from day time or know obstacles for example) to regenerate supporting information to be sent to the AR device 20.

Figure 2:
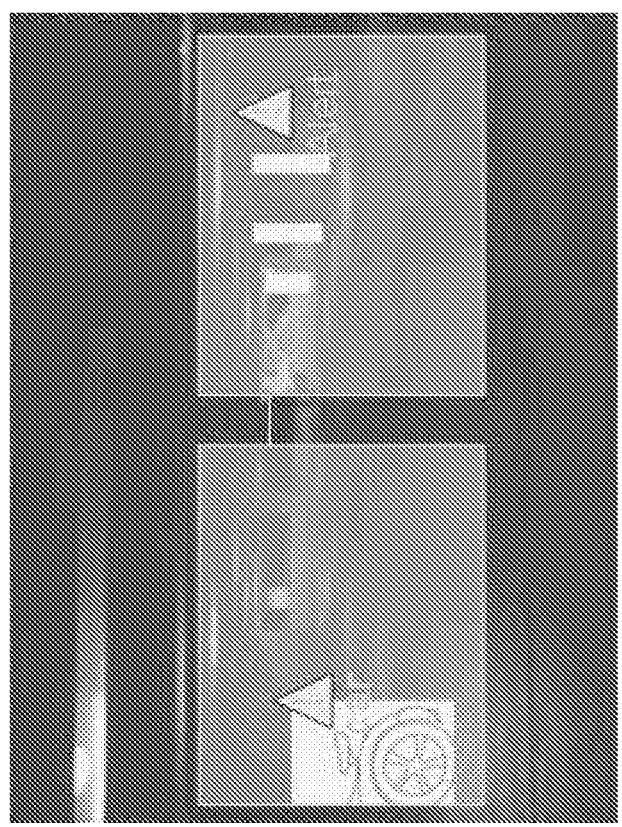
FIG. 2 shows an information overlay example.

As shown in the embodiment of FIG. 2, the AR device 20 (e.g., glasses or other display) can be used to overlay data (information) from the lighting network 100 (in this embodiment the lighting system 100 is located in a parking garage). In this case, the overlay data includes know obstacles (i.e., pillars and other cars) to be avoided.

In another embodiment related to security applications, sensors (e.g., cameras) collect information and transfer to the data to the AR device 20. In this case, the light levels in the location do not need to increase to allow security personnel to detect and intrusion.

In another embodiment, other types of visual impairment conditions can also be compensated for by the present invention. One such condition may be fog. At ground level, fog will obstruct the view of far away objects.

Figure 3:
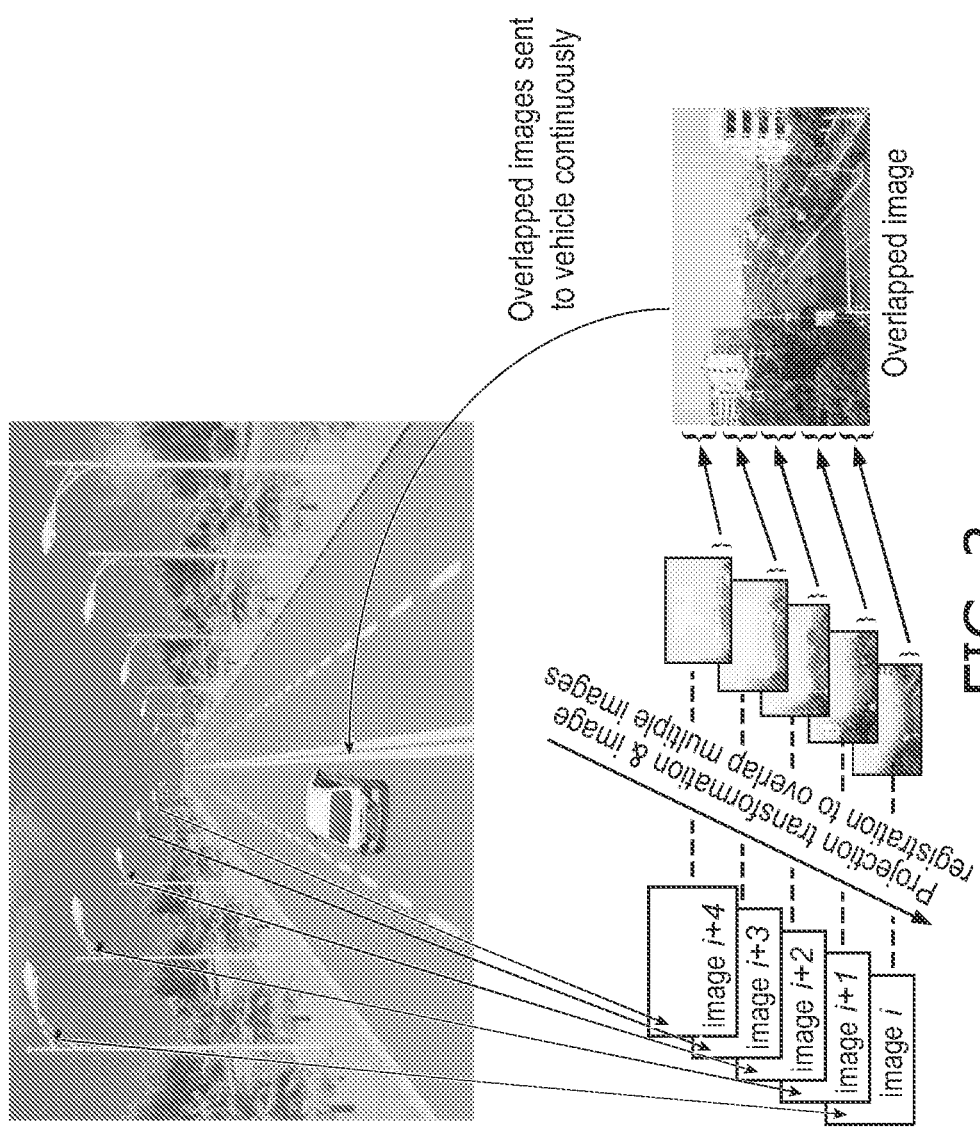
FIG. 3 shows an example of projection transformation and image registration.

In the embodiment of FIG. 3, the sensor 12 of each LU (LU1-LU8) includes a camera. Each camera capture images of the road ahead. In each image, near objects are clear while further ahead objects may be less clear. The cameras (or other sensors) placed higher up on the LUs (1-8) or further along on the road should have clearer view of the road ahead than the AR device 20. Using projection transformation & image registration applications that may be located in the control unit 30 or other processing unit, these multiple images may be overlapped which allows both nearby as well as further objects become "clear." The bottom right image shows the overlapping result of the left 5 images. By transmitting overlapped images to the AR device 20 (e.g., a vehicle) continuously, drivers can see real-time video fog-free on their vehicle dashboards, on wearable glasses or projected on the windshield.

Figure 4:
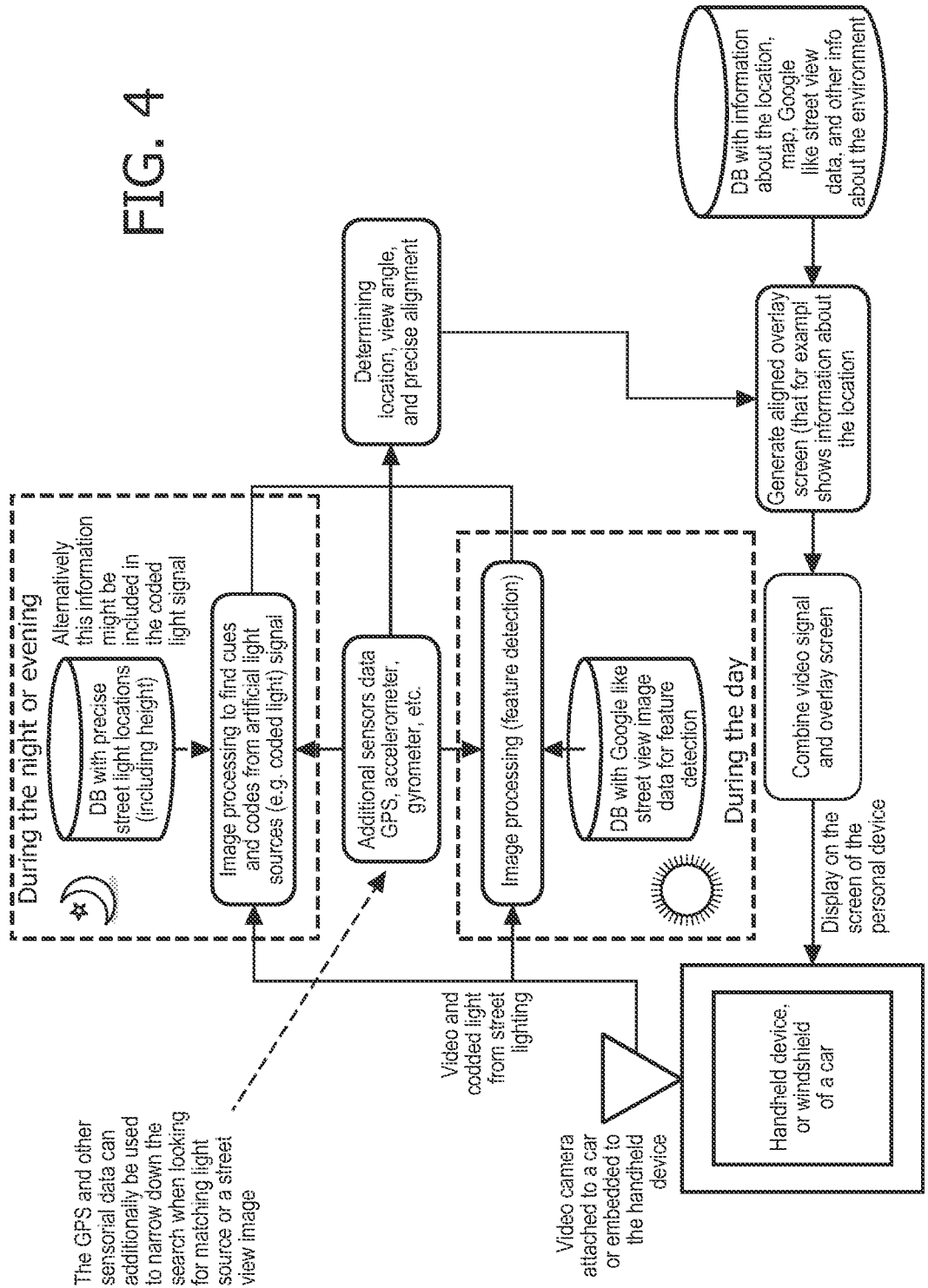
FIG. 4 shows a flow diagram showing various methods and algorithms in accordance with embodiments of the present invention.

FIG. 4 shows system flow diagram of how the lighting system 100 can interact and operate with the AR device(s) 20. The flow diagram highlights the conventional way for alignment (image processing and building feature detection) that can work in normal light conditions, e.g., during the day, and an improved method in the present invention (i.e. using LUs (1-8) and coded light) that can assist the AR device 20 in low light, e.g., dark conditions. Switching between the two methods (day verse night) for improved alignment can be either done automatically using light sensors in the AR device 20 or manually by a user of the AR device 20.

In FIG. 4, three databases (DB) are shown. The location of these DBs may vary depending on the particular implementation. The DBs may be part of database 32, part of the AR device 20 and/or separate DBs communicatively coupled to the lighting system 100 and/or the AR devices 20. In step S1, various data is gathered by the AR device 20 to be used for AR enhancement. In step S2, image processing is performed by the AR device 20 to find cues and/or codes from signals from the LUs (1-8). This will be described further below. In step S3, image processing is performed by the AR device 20 for feature detection. In step S4, alignment of the location, view and angle are determined by the AR device 20 using inputs from steps S1, S2 and/or S3. In step S5, information for an aligned overlay screen is generated. In step S6, the aligned overlay screen is combined with a video signal to be displayed on a display of AR device 20.

Figure 5:
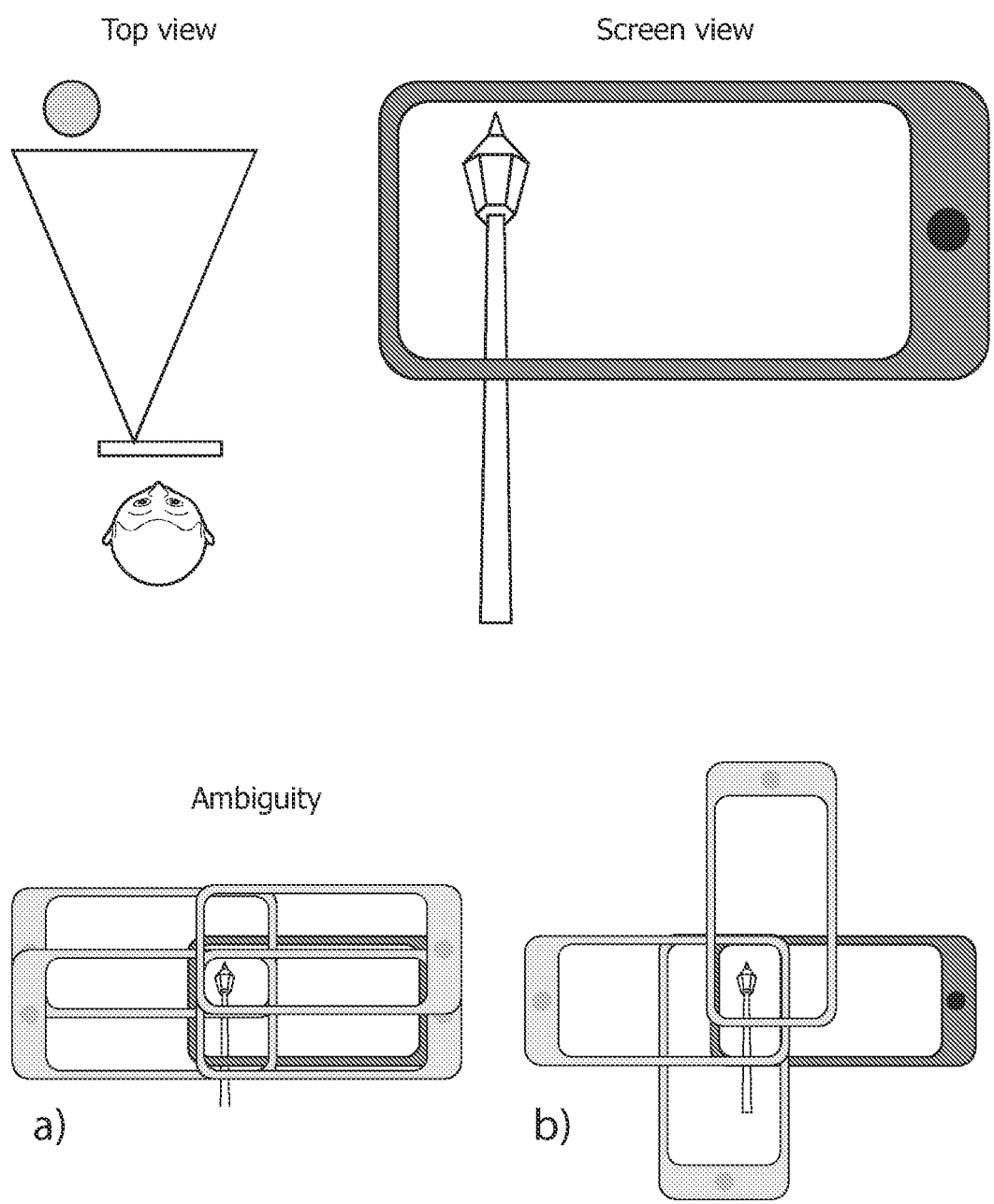
FIG. 5 shows a diagram for using coded light from one light source.
Figure 6:
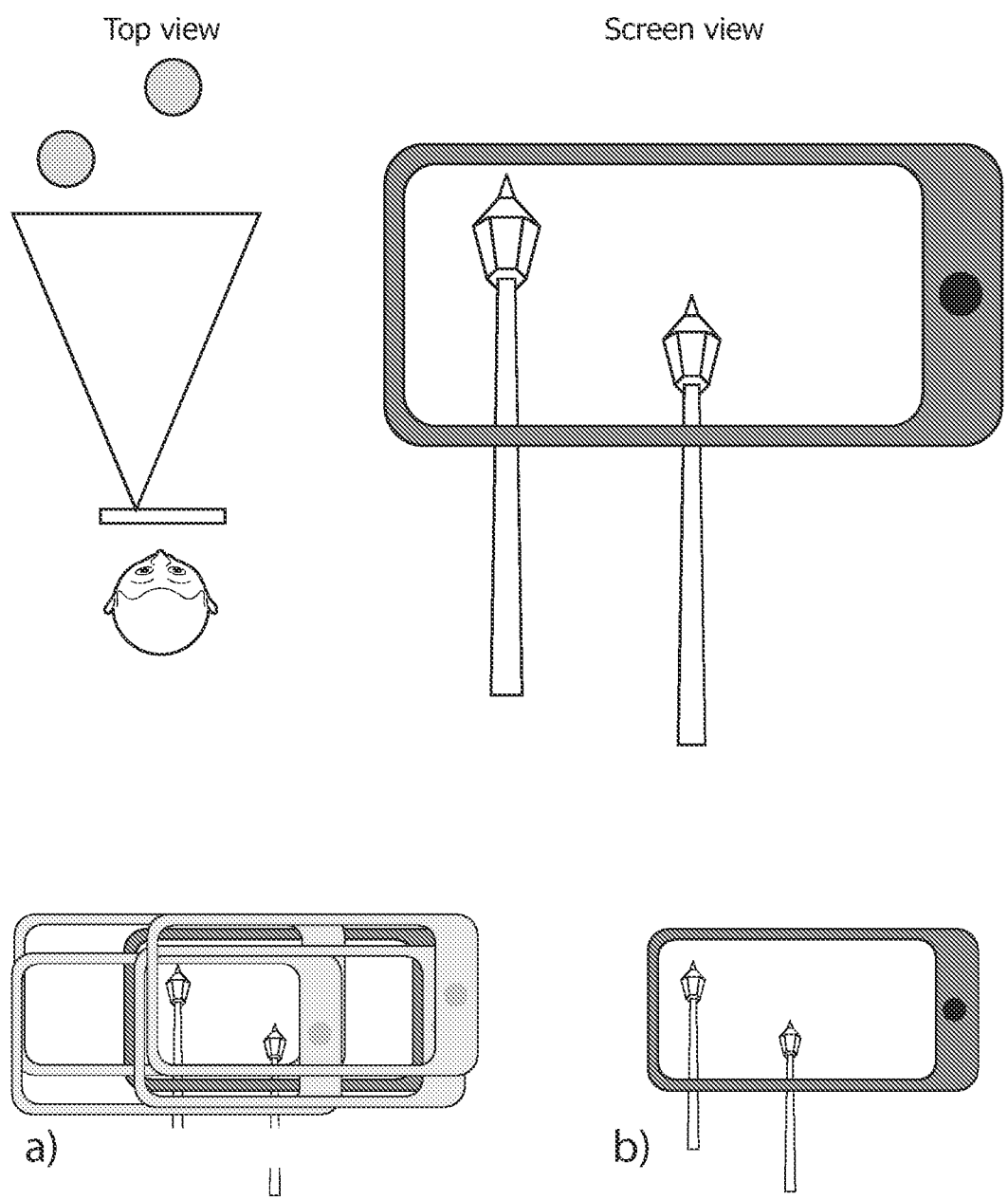
FIG. 6 shows a diagram for using coded light from two light sources.

FIGS. 5 and 6 are representations on how the alignment of a virtual and a physical layer can be implemented and how they are dependent on a number of LUs in the view of the AR device 20. FIGS. 5 and 6 reflect the situation when the screen view is fully aligned with the camera view. In other embodiments, the camera view may be larger (e.g. using a fisheye lens) so signals from more LUs (LU1-LU8) can be obtained around the user. In this case, the screen may only show a part of what is directly in front of the user. In addition, the AR device 20 may include more than one camera (e.g., one for the video stream on the screen and another for tracking surrounding light sources).

In FIG. 5, only one LU (LU1-LU8) is visible in the view of the AR device 20. In this case, depending on the how the sensors 21 are implemented in the AR device 20, there can be different levels of ambiguity in the view displayed to the user of the AR device 20. In the case shown in FIG. 5a, the AR device 20 (e.g., a mobile phone) has single sensor 21. In this case, the approximate GPS location of the user, properties of the sensor 21 (e.g., a camera) and location of the LU (LU1-LU8) is known. For this case, the error is shown with grayed out phone silhouettes in FIG. 5a. If instead each pixel of the camera serves as a coded light sensor 21, the error space significantly drops as shown in FIG. 5b. If an orientation sensor (accelerometer) is added to the AR device 20 then the error can be almost fully eliminated.

If there are more than one LU (LU1-LU8) in view of the AR device 20, the error can be reduced even further as shown in FIG. 6a (using a single sensor 21). In the case where each pixel of the camera in the AR device 20 serves as a coded light sensor 21, the view point of the user of the AR device 20 can even more precisely be estimated as shown in FIG. 6b.

It will also be appreciated by one of ordinary skill in the art that in both cases described in FIGS. 5 and 6, the error was in a vertical plane and this is the same for the horizontal plane. Conventional 3D accelerometers can be used to reduce overall error by estimating 3D orientation of the AR device 20 in space.

Many conventional devices are already equipped with more than one light sensors or cameras. For instance, a Smartphone or a car can have a front camera and a back camera. As described above, using with information from the lighting system 100 about the AR device's 20 location and orientation, cues and/or codes picked up from the lighting system 100 by multiple camera's in the AR device 20 can be helpful to fine-tune determination the AR device's 20 position and orientation.

Figure 7A:
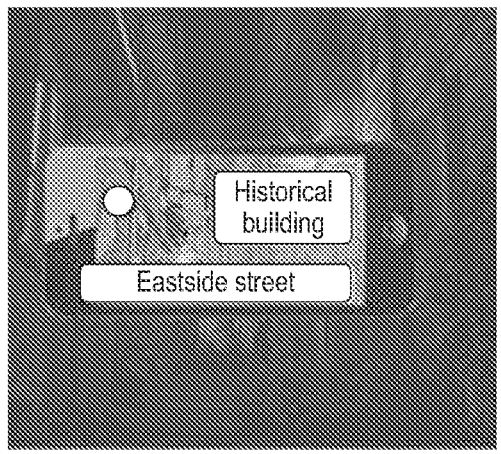
FIG. 7 shows an overlay display.
Figure 7B:
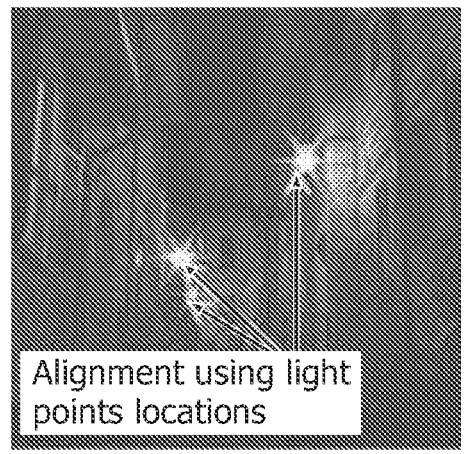
Figure 7C:
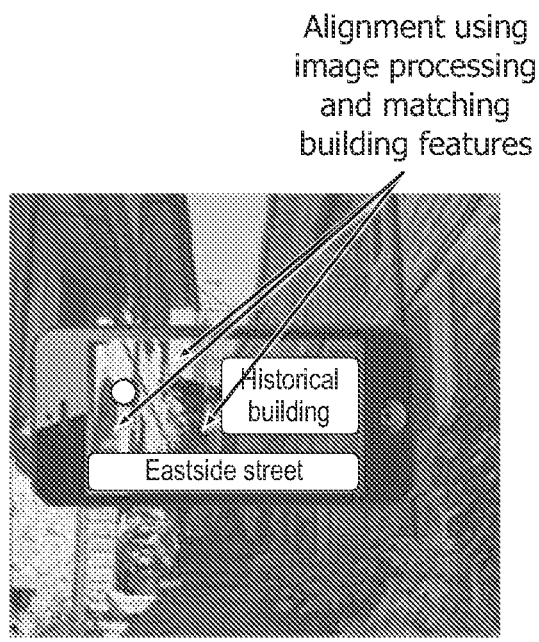

FIG. 7 shown another embodiment related to an AR application for a mobile device such as a phone. The AR application can during the day (normal lighting conditions) use image processing for better image alignment (FIG. 7c) and in the evening/night time (low light conditions) use information from LUs (LU1-LU8) to improve performance (FIG. 7b).

In FIG. 7b, the sensor 21 (e.g., a camera in this example) of the AR device (e.g., a smartphone in this example) detects coded light signals (including unique ID_numbers) from each LU (LU1-LU8) view. Based upon the coded light signals, a location of the LU(s) (LU1-LU8) can be determined, provided or obtained. For example, such information can be included in one or more of the DBs in FIG. 5, in the database 31 or over the Internet or a map service like Google. This information is then used by the AR device 20 to estimate what is in the view of the AR device 20 and align it with the information layer or even provide a night vision like service. For example, this can be done using street view images from a Google map as shown in FIG. 7a.

It is noted that this embodiment requires that during a commissioning stage the location of each the LUs (LU1-LU8) is recorded and stored in an accessible manner as described above. This can be done in a similar manner as currently being used for the image information for example for Google street view where a car drives through the streets and records location and image information.

The commissioning stage may be simplified if the LUs (LU1-LU8) are communicatively connected as discussed in reference to FIG. 1. For example, a 6LowPan based network can be used each of the LUs (LU1-LU8) has a unique IP address. 6LoWPAN is an acronym of IPv6 over Low power Wireless Personal Area Networks. Methods are also know in the art for providing location information based on IP addresses. If the LU (LU1-LU8) transmits its unique IP address using the coded light signal during the night than this can provide the link between the LU (LU1-LU8) and buildings or other general features in the view of the AR device 20.

Figure 8A:
FIG. 8 show another overlay display.
Figure 8B:

Another embodiment of the present invention is related to AR applications for automobiles. Many automobiles are equipped with a daylight sensor enabling them to automatically switch on the lights. Such automobiles may also include rear view cameras and also forward-looking cameras are integrated in cars to enable new safety functions such as Forward Collision Warning, Following Distance Indication and Lane Departure Warning. Using the lighting system 100 that is in the view of the AR device 20 (e.g., a car in this embodiment) the position of the car can be estimated that will allow for more precise alignment of navigational or other type of information within the view of the driver. FIG. 8 shows two examples of the windshield overlays for this embodiment. Providing alignment in those situations is crucial in order to provide optimal safety to drivers by informing the driver about upcoming traffic situations (e.g., curves, traffic jams in FIG. 8a) and navigation guidance (e.g., exits, turns in FIG. 8b).

The foregoing detailed description has set forth a few of the many forms that the invention can take. The above examples are merely illustrative of several possible embodiments of various aspects of the present invention, wherein equivalent alterations and/or modifications will occur to others skilled in the art upon reading and understanding of the present invention and the annexed drawings. In particular, regard to the various functions performed by the above described components (devices, systems, and the like), the terms (including a reference to a "means") used to describe such components are intended to correspond, unless otherwise indicated to any component, such as hardware or combinations thereof, which performs the specified function of the described component (i.e., that is functionally equivalent), even though not structurally equivalent to the disclosed structure which performs the function in the illustrated implementations of the disclosure.

The principles of the present invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

Although a particular feature of the present invention may have been illustrated and/or described with respect to only one of several implementations, such feature may be combined with one or more other features of the other implementations as may be desired and advantageous for any given or particular application. Furthermore, references to singular components or items are intended, unless otherwise specified, to encompass two or more such components or items. Also, to the extent that the terms "including", "includes", "having", "has", "with", or variants thereof are used in the detailed description and/or in the claims, such terms are intended to be inclusive in a manner similar to the term "comprising".

The present invention has been described with reference to the preferred embodiments. However, modifications and alterations will occur to others upon reading and understanding the preceding detailed description. It is intended that the present invention be construed as including all such modifications and alterations. It is only the claims, including all equivalents that are intended to define the scope of the present invention.

The invention claimed is:

1. A method for improving alignment of real images and a virtual overlay in an Augmented Reality (AR) device, said method comprising the steps of:

in the AR device,
  receiving information to form a virtual overlay of an area related to the real images from an augmented reality information source having a camera;
  generating an initial alignment of the virtual overlay and the real images;
  receiving a plurality of sensor data relating to the area and outside the area from a plurality of sensors in a lighting system or other network different from the augmented reality information source, wherein the plurality of sensor data includes information related to nearby objects identified by the lighting system or other network, historical information or environmental conditions in the area and wherein the plurality of sensor data are overlapped to form an overlapped sensor data overview; and improving the initial alignment of the virtual overlay and real images using the overlapped sensor data overview.

2. The method according to claim 1, wherein the step of receiving the a plurality of sensor data includes receiving at least one of the real images during a low light or nighttime time period and the at least one image is a historical image of the area during a high light or daytime time period.

3. The method according to claim 1, wherein the receiving step includes receiving the plurality of sensor data from a plurality of sensors in the lighting system or other network, wherein the plurality of sensor data are consecutive images along a path traveled by the augmented reality device.

4. The method according to claim 1, further including the step of determining whether to signal a change in lighting strategy of the lighting system based on a capability of the AR device.

5. The method according to claim 1, wherein the at least one other sensor data includes sensor data relating to the area from a sensor in a lighting system or other network different from the augmented reality information source that is not detected by the camera of the augmented reality information source.

6. An Augmented Reality (AR) device comprising:
a processor to receive information to form a virtual overlay of an area related to real images from an augmented reality information source having a camera and generate an initial alignment of the virtual overlay and the real images;

wherein the processor is configured to receive sensor data from a plurality of sensors in a lighting system or other network different from the augmented reality information source, the lighting system arranged to receive a sensor data of inside and outside the area, wherein the sensor data includes information related to nearby objects identified by the lighting system or other network, historical information or environmental conditions in the area and wherein the sensor data is overlapped to form an overlapped sensor data overview, and;

wherein the processor is arranged to use the overlapped sensor data overview to improve the alignment of the virtual overlay and real images.

7. The AR device according to claim 6, wherein the sensor data are consecutive images along a path traveled by the augmented reality device.

8. The AR device according to claim 6, wherein processor is further configured to determine whether to signal a change in lighting strategy of the lighting system based on a capability of the AR device.

9. The AR device according to claim 6, wherein the AR device is a mobile phone.

10. The AR device according to claim 6, wherein the AR device is an automobile.

11. The AR device according to claim 6, wherein the AR device is wearable by a user.

12. An AR support system comprising:
a lighting system or other network including a plurality of sensors and a communication interface, wherein at least one of the plurality of sensors is a camera, presence detection device or other unit capable of classifying objects within sensing range of the sensor; and
a control unit including a communication unit in communication with one or more of the plurality of sensors, wherein the communication interface is further configured to transmit and receive data between one or more AR devices, wherein the one or more AR devices generate an initial alignment of a virtual overlay and real images of an area, wherein the control unit overlaps a plurality of sensor data from the plurality of sensors of inside and outside the area to form an overlapped sensor data overview and transmits the overlapped sensor data overview to the AR device.

13. The AR support system of claim 12, wherein the received data from the one or more AR devices is used by the lighting system to improve efficiency and/or performance of the lighting system.

14. The AR support system of claim 12, wherein the lighting system further provides historical information or environmental conditions to the AR device.

* * * * *